United States Patent Office 3,629,145
Patented Dec. 21, 1971

3,629,145
METHOD FOR PREPARING CATALYSTS
Kiyoshi Morikawa, Kanagawa, Etsuro Echigoya and Takayasu Shirasaki, Tokyo, and Itsuo Furuoya, Osaka, Japan, assignors to Takeda Chemical Industries, Ltd., Osaka, Japan
No Drawing. Filed Aug. 15, 1968, Ser. No. 752,783
Claims priority, application Japan, Aug. 16, 1967, 42/52,342; Aug. 19, 1967, 42/53,141; Sept. 8, 1967, 42/57,643
Int. Cl. B01j 11/82
U.S. Cl. 252—432
10 Claims

ABSTRACT OF THE DISCLOSURE

A supported palladium catalyst of high catalytic activity and excellent thermal stability is prepared by carrying out at least twice a series of process steps which consist of bringing an amorphous solid acid carrier (silica, alumina, etc.) containing acid sites into contact with a basic aqueous solution of a palladium amine or a palladium lower alkylamine complex—and, alternatively, also into contact with an aqueous solution of a water-soluble salt of a 3- or 4-valent metal (aluminum nitrate, titanium tetrachloride, etc.), and subjecting the thus-treated solid carrier to a thermal treatment (heating e.g. to 100 to 800° C.). If the starting solid carrier has no acid sites, as e.g. active carbon, acid sites are produced by treatment with oxyacid. The thus-obtained supported palladium catalyst is useful in inter alia the hydrogenation of a benzene nucleus.

This invention is concerned with a method for preparing a novel supported palladium catalyst.

Palladium has long been employed as a catalyst for synthesizing various kinds of organic compounds taking advantage of its high hydrogenating activity, high resistibility to acids and the lowest cost among so-called precious metals. However, palladium has a very poor thermal stability in comparison with other precious metals such as platinum and ruthenium, and therefore its catalytic activity decreases rapidly when used in a gas-phase reaction at a rather high temperature, which necessarily makes the palladium catalyst impossible to be used over a long period of time at a high temperature. For improving thermal stability of the palladium catalyst, it has been proposed to support palladium on various kinds of solid carriers such as silica gel, alumina gel, active carbon, and the like. But none of these supported palladium catalysts is satisfactory in their thermal stability, and, moreover, in case of using active carbon, it is hardly possible to allow palladium to be distributed homogeneously onto active carbon surface and, therefore, the resulting palladium catalyst has a rather low catalytic activity.

The present invention is directed to the embodiment of a method for preparing palladium catalyst of high thermal stability.

The principal object of the present invention is, thus, to provide a supported palladium catalyst of high thermal stability, and another object of the present invention is to provide a method for preparing a supported palladium catalyst of high thermal stability. According to the present invention, there can be produced a supported palladium catalyst which has a high catalytic activity and an excellent thermal resistance, that is, can retain its high catalytic activity even when used under rather high temperature conditions over a long period of time and, therefore, the supported palladium catalyst prepared by the present invention can widely be used in many kinds of catalytic reactions requiring high temperature over a long period of time. Moreover, the present supported palladium catalyst has a high ability to hydrogenate a benzene nucleus. This is quite an unexpected fact since it has commonly been considered as impossible to hydrogenate a benzene nucleus by palladium catalysts.

The supported palladium catalyst of the present invention can be prepared by either of the following two methods. That is, (1) the 1st method of the present invention comprises conducting twice or more a series of processes which comprises allowing an amorphous solid acid carrier containing acid sites to contact with a basic aqueous solution of a palladium ammine or lower alkylamine complex and subjecting thus-treated solid acid carrier to a thermal treatment, and (2) the 2nd method of the present invention comprises subjecting an amorphous solid acid carrier containing acid sites to contact with an aqueous solution of a palladium ammine or alkylamine complex and to contact with an aqueous solution of a water-soluble salt of a metal having 3 or 4 valencies, and subjecting thus-treated solid acid carrier to a thermal treatment.

As the amorphous solid acid carrier containing acid sites, there is preferably used one which shows large specific surface areas, high acid site content and high thermal stability, and this is exemplified by silica, alumina, silica-alumina, silica-alumina-zirconia, alumina-boria, silica-magnesia, activated clay and acid sites-containing active carbon, etc. Oxides such as silica, alumina, zirconia, boria, magnesia, activated clay etc. and compounds consisting of one or more thereof contain an appreciable amount of acid sites in their molecules and, therefore, can be used as they are, in the present methods. Active carbon, on the other hand, cannot be used as it is in this method because it contains no appreciable acid sites therein, and it is thus necessary to introduce acid sites such as carboxylic groups and acidic hydroxyl groups on the active carbon surface before it is employed in this method. For this purpose, active carbons are treated with an aqueous solution containing an oxyacid. As the oxyacid, use is made e.g. of nitric acid, chromic acid, peroxoacids and peracids, among which nitric acid is most desirable. Concentration of the aqueous solution is in the range of 20 to 60, more desirably 50 to 60 weight percent. Practically, active carbon is immersed in the aqueous solution containing the oxyacid under stirring at a temperature ranging from room temperature (15 to 30° C.) to 130° C., desirably 50° C. to 100° C., more desirably 80° C. to 100° C., for about 2 to about 5 hours followed by washing and drying.

The amorphous solid acid carrier containing acid sites is used in this method in a suitable form such as powder, particle, tablet, granule, and the like.

As the aqueous solution of palladium amine or lower alkylamine complex which is to be contacted with the solid acid carrier, there is used one derived from palladium salts and ammonia or water-soluble lower alkyl amines having 1 to 4 carbon atoms, typical examples of which are complexes of palladium ammine, palladium methylamine, palladium ethylamine, palladium ethylene diamine, palladium ethylenetriamine, palladium butylamine, etc. The aqueous solution of a palladium ammine or lower alkylamine complex is prepared by a conventional way, for instance, by dissolving a palladium salt of an inorganic acid such as palladium chloride and palladium nitrate in an aqueous ammonium solution of about 2 to about 30 weight percent concentration, in the corresponding aqueous alkylamine solution of not less than about 1 weight percent concentration or in the alkylamine itself. Here, the molar ratio of the ammonia or the alkylamine to the palladium ion is about 4 to about 40. Thus, substantially all the palladium salts used are converted into palladium ammine complex or palladium lower alkylamine complex to yield an aqueous solution containing the complex as its ionic form and also the excess amount of ammonia or of the lower alkylamine therein.

The aqueous solution prepared above can be used in the following steps as it is or after diluting with water to a proper concentration.

The contact of the solid acid carrier with the aqueous solution is conducted in a per se conventional manner, for example, by immersing the carrier in the solution, by spraying the solution on the carrier, by subjecting the two to countercurrent or cocurrent contact, etc., among which the immersion technique is most desirable.

The aqueous solution is used preferably in an amount of about 2 to 10, more desirably about 3 to about 5 parts by volume per volume of the solid acid carrier so as to achieve an effective contact.

In the 1st method of this invention, the total amount of the palladium ammine or lower alkylamine complex to be contacted with the active carbon having acid sites is about 0.001 to about 6, more practically about 0.03 to about 2 meq. per gram of the active carbon. When the carrier is other than active carbon having acid sites, the total amount to be contacted is about 0.001 to about 3, more practically about 0.03 to about 1 meq. per gram of the solid acid carrier. The operation of contacting is repeated twice or more as mentioned below, and this repetition can increase not only the catalytic activity but also the thermal stability of the supported palladium catalysts to a large extent. The respective amounts of the complex to be contacted with the carrier in each contacting-operation are practically the same. Thus, for example, if the contacting-operation is repeated $n$ times with the use of active carbon having acid sites, the amount of the palladium complex to be contacted with the active carbon in each operation can be about $0.001/n$ to about $6/n$, more practically about $0.03/n$ to about $1/n$ meq. per gram of the active carbon.

($0.001 \times \frac{1}{2}$ mole of palladium corresponds to 1 meq. (milliequivalent) of palladium and thus 1 meq. of the palladium complex is meant by $0.001 \times \frac{1}{2}$ mole of the palladium complex calculated as palladium.) Therefore, the concentration of the aqueous palladium complex solution to be used in each operation varies with the volume of the solution contacted with the carrier, the specific gravity of the carrier and repetition numbers of the contacting-operation, and is suitably selected. The contact of the solid acid carrier with the aqueous solution of a palladium complex is generally carried out at around room temperature, though the contact can be effected under heating at a temperature not higher than about 100° C. The contact of the solid acid carrier with the aqueous solution can be allowed to continue for several hours to several days. The above-treated solid acid carrier is then dried, and subjected to a thermal-treatment.

Before the thermal-treatment, the above-treated solid acid carrier can be diluted with a suitable solid carrier such as active carbon, silica, alumina, silica-alumina, etc.

The thermal treatment is generally conducted by heating the solid acid carrier treated according to the previous procedure (contacting with the aqueous solution) at about 100 to about 500° C., more desirably around 150° C. in case of using active carbon having acid sites as the solid acid carrier, and, when using other solid acid carrier than active carbon having acid sites at about 300 to about 800° C., more desirably at about 300 to about 500° C.

The 1st method of this invention is characterized by conducting twice or more, preferably 2 to 4 times, a series of procedures which consists of the afore-illustrated contact of the solid acid carrier carrier with the aqueous solution and a subsequent thermal treatment of thus-contacted solid acid carrier.

Upon conducting the afore-mentioned series of procedures, the conditions in any of the respective repetitions are preferably the same with each other, though substantially the same effect can be attained by conducting each of the repetitions under respectively different conditions so far as no drastic variation of conditions is brought about.

In the 2nd method of this invention, the solid acid carrier previously contacted with the aqueous solution of a palladium ammine or lower alkylamine complex according to the afore-mentioned procedures is, then, after drying and desirably subjecting to the above-mentioned thermal-treatment, contacted with an aqueous solution of a water-soluble salt of a metal having 3 or 4 valencies. The solid acid carrier to be contacted with the aqueous solution of the metal salt in this method can be that which is prepared by subjecting the solid acid carrier only once to the afore-mentioned contacting with the aqueous solution of the palladium complex, followed by drying and desirably subjecting to the thermal-treatment, or that which is prepared by conducting twice or more, according to the afore-mentioned 1st method, a series of processes consisting of contacting the solid acid carrier with the aqueous solution of the palladium complex and drying and desirably subjecting the resultant to the thermal-treatment.

As the metal cations having 3 or 4 valencies, there are desirably used those capable of forming metal oxide which is hardly-reducible and has a high heat of formation such as not lower than about 100 kcal./metal atom and also has a high melting point such as not lower than about 1000° C., typical examples of the metal being aluminum, lanthanum, thorium, manganese, zirconium, titanium, cerium, etc. Typical examples of the water-soluble metal salts are those which give, on dissociation, inorganic anions such as $NO_3^-$, $Cl^-$, and $SO_4^=$ or organic anions such as

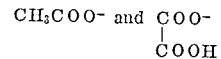

These water-soluble salts of metals having 3 to 4 valencies include, for example, aluminum nitrate, lanthanum nitrate, thorium nitrate, manganese nitrate, aluminum sulfate, lanthanum chloride, thorium sulfate, manganese chloride, zironium oxychloride, titanium tetrachloride, cerium acetate, etc. Among these salts, nitrates of aluminum, lanthanum and thorium, and also cerium acetate are especially very successfully used in this method.

The aqueous solution of the water-soluble salt of the metal can be prepared by dissolving the salt in water. The contact of the solid acid carrier prepared according to the previous procedures with the aqueous solution of the metal salt can be conducted similarly to the procedures for contacting the solid acid carrier with the aqueous solution of palladium complex.

The aqueous solution of the metal salt is used preferably in an amount of about 2 to about 10, more desirably about 3 to about 5 parts by volume per volume of the solid acid carrier to be contacted. Contacting temperature and duration of contacting can also be similar to the procedures for contacting the solid acid carrier with the aqueous solution of the palladium complex.

Thus-treated solid acid carrier is then, after drying, subjected to a thermal-treatment. The thermal-treatment is generally conducted by heating the solid acid carrier contacted with the aqueous solution of the metal salt at about 100 to about 250° C., desirably around 150° C. in case of using active carbon having acid sites, and at about 300 to about 800° C., more desirably at about 300 to about 500° C. when using another solid acid carrier than active carbon having acid sites. A thermal treatment in an atmosphere containing oxygen is especially desirable.

In this method, a series of procedures, which consists of contacting solid acid carrier with aqueous solution of the palladium complex, followed by drying and desirably subjecting to the thermal-treatment, contacting thus-treated solid acid carrier with the aqueous solution of the metal salt, followed by drying, and subjecting the resultant to the thermal-treatment, can be conducted only once or may be repeated twice or more, desirably 2 to 4 times. In the latter case, conditions of the respective repetitions are preferably the same with each other, though substantially the same result is obtained by conducting each of the repetitions under respectively different conditions so long as no drastic variation of conditions is brought about.

Moreover, it is also possible that the solid acid carrier previously subjected to, once or twice or more, the above-mentioned series of procedures comprising contacting with the aqueous solution of the palladium complex and contacting with the aqueous solution of the metal salt is further subjected to, once or twice or more, the contact with the aqueous solution of the palladium complex.

During the above-mentioned successive contacting procedures, there may suitably be inserted the drying and the thermal treatment.

Additionally stating, in this method, the solid acid carrier previously contacted with the aqueous solution of palladium complex can be treated with an aqueous ammonia solution or an aqueous solution of a water-soluble amine (for instance, by immersing the solid acid carrier into the aqueous solution, by spraying the solution over the solid acid carrier, etc.) before the contact with the aqueous solution of the metal salt.

In the 2nd method of the invention, the sum of the total amount of the palladium ammine or lower alkyl-amine complex to be contacted with the solid acid carrier and the total amount of the water-soluble salt of a metal having 3 or 4 valencies to be contacted with the carrier previously treated with the complex is about 0.001 to 6, more practically about 0.03 to about 2 meq. per gram of the carrier when the carrier is active carbon having acid sites, and about 0.001 to about 3, more practically about 0.03 to about 1 meq. per gram of the carrier when using another carrier than active carbon having acid sites, and a meq. ratio of the former total amount—the latter total amount is about 1/100 to about 10/1, more desirably about 1/40 to about 1/1. Also in this method, when contact with the palladium complex and/or that with the water-soluble metal salt is carried out twice or more, practically the same amount of the palladium complex is used in each of the repetitions, as is also the case with the metal salt.

(0.001×⅓ mole of the trivalent metal and 0.001×¼ mole of tetravalent metal correspond to 1 meq. of the trivalent and the tetravalent metal, respectively, and thus, 1 meq. of the trivalent metal salt, for example, is meant by 0.001×⅓ mole of the salt calculated as the metal.)

Therefore, the concentration of the aqueous palladium complex solution and that of the aqueous solution of the water-soluble metal salt vary with the volume of the solutions to be used for the contacts, the specific gravity of the carrier and numbers of the contacts, and can suitably be selected.

In the catalyst composition prepared by the 1st method, palladium complex ions are attached to acid sites of the solid acid carrier, and in that prepared by the 2nd method, palladium ions and tri- or tetravalent metal ions are attached to acid sites of the solid acid carrier, both probably through cation exchange reactions.

The catalyst composition produced by the present method is, after subjecting, if necessary, to a conventional reduction treatment, put to practical use as a catalyst.

For the purpose of a better understanding of this invention, the following examples are given. However, it is to be understood that this invention is not limited to these examples.

In these examples, parts by weight bear the same relation to parts by volume as do grams to milliliters.

EXAMPLE 1

To 4 parts by weight of palladium chloride dissolved in about 100 parts by volume of water is added dropwise 1000 parts by volume of an aqueous ammonium solution (28 wt. percent), and water is added to the mixed solution so as to make the whole volume 10,000 parts by volume. These procedures give an aqueous ammonium solution containing 0.00451 meq./ml. of palladium ammine complex.

A vessel is charged with 50 parts by weight of powdery silica-alumina (alumina content: 13 wt. percent, specific surface area: 400 m.²/g. acidity measured in water: 1.0 meq./g.; commercially available e.g. as "Nipponcat") and then with 335 parts by volume of the above-prepared aqueous ammonium solution containing palladium ammine complex. The vessel is kept standing overnight under room temperature with occasional stirring, at the end of which time the content of the vessel is washed with water until no anion is detected and finally subjected to filtration to separate the solid. The solid is dried at room temperature, followed by heating at 300 to 500° C. for 2 hours. The resultant solid is then mixed with 250 parts by volume of an aqueous solution containing 50 meq. of thorium nitrate, followed by keeping standing at room temperature overnight, at the end of which time the solid is washed with water until no nitrate ion is detected. The solid is separated from the mixture by filtration, and, after drying, heated at 300 to 500° C. for 2 hours, thus yielding 50 parts by weight of the desired catalyst which contains 0.03 meq./g. of palladium and about 1.00 meq/g. of thorium.

0.50 part by weight of the catalyst thus-produced is charged in a Pyrex glass reaction tube and reduced by heating at 300° C. under hydrogen gas stream. The catalytic activity of the catalyst thus produced is measured. As the control, the catalytic activity of a catalyst (palladium content: 0.03 meq./g.) prepared in the same way as above, but omitting the treatment with the aqueous solution of thorium nitrate and the procedure to be followed, is also measured.

The result is as follows:

TABLE 1.—CATALYTIC ACTIVITY OF THE PALLADIUM CATALYSTS

| | Velocity constant in hydrogenation of benzene (first order with respect to hydrogen pressure) $\times 10^2$, k (mol/hr. g. atm.) | | | | | | | Catalytic activity in dehydrogenation of cyclohexane to benzene cyclohexane conversion to benzene (percent) | | | | | | |
|---|---|---|---|---|---|---|---|---|---|---|---|---|---|---|
| Reaction time (hr.) | 0 | 1 | 2 | 3 | 4 | 5 | 6 | 0 | 1 | 2 | 3 | 4 | 5 | 6 |
| Catalyst of Example 1 | 1.85 | 1.8 | 1.78 | 1.75 | 1.75 | | 1.75 | 62 | 47 | | 44 | 44 | | 44 |
| Control | 1.85 | 1.38 | 1.0 | 0.63 | 0.63 | 0.63 | | 54 | 42 | 34 | 33 | 31 | 27 | |

Reaction conditions:
H₂:benzene=10:1 (molar ratio); temperature=150° C.; catalyst amount=0.50 g.; flow rate of H₂=18 l./hr. (20° C.).
H₂:cyclohexane=10:1 (molar ratio); temperature=285° C.; catalyst amount=0.50 g.; flow rate of H₂=18 l./hr. (20° C.).

EXAMPLE 2

A vessel is charged with 100 weight parts of the same silica-alumina as in Example 1 and then with 335 parts by volume of an aqueous ammonium solution containing 0.00451 meq./ml. of palladium ammine complex, which is prepared in the same manner as in Example 1. The vessel is kept standing overnight at room temperature, at the end of which time a solid is separated by filtration, and dried at room temperature, followed by heating at 300 to 500° C. for 2 hours. The solid is then mixed with 400 parts by volume of an aqueous solution containing 100 meg. of thorium nitrate, followed by keeping standing at room temperature overnight, after which time the mixture is washed with water until no nitrate ion is detected. The solid is separated from the mixture by filtration, and, after drying, heated at 300 to 500° C. for 2 hours. The solid is further mixed with 335 parts by volume of the same aqueous ammonium solution as above. The mixture is kept standing overnight at room temperature, and then subjected to the same procedures as described above. These procedures give 100 parts by weight of the desired catalyst composition which contain 0.03 meq./g. of palladium and 1.0 meq./g. of thorium.

0.50 part by weight of the catalyst composition is reduced by heating at 300° C. under hydrogen gas stream. Catalytic activity of the catalyst thus prepared is measured. As the control, there is used a catalyst (palladium content 0.03 meq./g.) prepared in the same way as above but omitting the treatment with the aqueous solution of thorium nitrate and the procedures to be followed.

The result is as follows:

TABLE 2.—CATALYTIC ACTIVITY FOR THE DEHYDROGENATION OF CYCLOHEXANE TO BENZENE

Cyclohexane conversion to benzene (percent)

| Reaction time (hours) | 0 | 1 | 2 | 3 | 4 | 5 | 6 |
|---|---|---|---|---|---|---|---|
| Catalyst of Example 2 | 66 | 62 | 61 | 61 | 61 | 61 | 61 |
| Control | 54 | 42 | 35 | 34 | 32 | 27 | |

NOTE.—Reaction conditions: $H_2$:benzene=10:1 (molar ratio); temperature: 285° C.; catalyst amount: 0.5 g.; flow rate of $H_2$: 18 l./hr. (20° C.).

EXAMPLE 3

A vessel is charged with 100 parts by weight of the same silica-alumina as in Example 1 and then with 222 parts by volume of an aqueous solution containing 0.00451 meq./ml. of palladium amine complex, which is prepared in the same manner as in Example 1.

The vessel is kept standing overnight at room temperature, at the end of which time the content of the vessel is washed with water until no anion is detected, and subjected to filtration to separate solid. The solid is dried at room temperature, followed by heating at 300 to 400° C. for 2 hours. Thus-treated solid is then mixed with 222 parts by volume of the same aqueous ammonium solution as above and the mixture is kept standing overnight at room temperature, after which time washing with water, separation of a solid, drying of the solid and heating of the solid are conducted in the same manner as above. Thus-treated solid is again subjected to the same procedures as above which comprise contacting with the aqueous ammonium solution containing palladium amine complex, drying and heating, whereby there is yielded 100 parts by weight of a catalyst containing 0.03 meg./g. of palladium.

After the catalyst is reduced by heating at 300° C. under hydrogen gas stream, its catalytic activity is measured.

The result is as follows:

TABLE 3

| Catalyst | Velocity constant in hydrogenation of benzene×$10^2$ $k$ (mol/g. hr. atm.) | $k$×100/$k$ of the cat. of Ex. 3 |
|---|---|---|
| Catalyst of Example 3 | 1.35 | 100 |
| Control [1] | 0.65 | 48 |
| Known catalysts: | | |
| Palladium on silica-alumina catalyst prepared by impregnation method [2] | 0.18 | 13 |
| Palladium on alumina catalyst [3] | 0.32 | 24 |
| Palladium on active carbon catalyst [4] | 0.10 | 7 |

[1] Catalyst (palladium content: 0.03 meg./g.) prepared by conducting, only once, a series of processes consisting of contacting with an aqueous ammonium solution containing palladium ammine complex, drying and heating, by the same manner as in Example 3.
[2] Catalyst prepared by immersing silica-alumina into a hydrochloric acid solution of palladium chloride and evaporating water (palladium content: 0.03 meq./g.).
[3] Catalyst prepared by absorbing a hydrochloric acid solution of palladium chloride on alumina (palladium content: 0.03 meq./g.).
[4] Catalyst prepared by absorbing a hydrochloric acid solution of palladium chloride on active carbon (palladium content: 0.03 meq./g.).

NOTE.—Reaction conditions: $H_2$: benzene=10:1 (molar ratio); temperature: 150° C.; flow rate of $H_2$: 18 l./hr. (20° C.); catalyst amount: 0.5 g.; reaction time: from 3 to 4 hrs.

EXAMPLE 4

100 parts by weight of the catalyst prepared by quite the same manner as in Example 3 is mixed with 200 parts by volume of an aqueous solution containing 0.5 meg./ml. of lanthanum nitrate, and the mixture is kept standing overnight at room temperature, at the end of which time the mixture is washed with water until no nitrate ion is detected, followed by filtration. The separated solid is dried and then heated at 400° C. for 2 hours to yield 100 parts by weight of a catalyst which contains 0.03 meg./g. of palladium and 1.00 meg./g. of lanthanum.

After the catalyst is reduced by heating at 300° C. under hydrogen gas stream, its catalytic activity is measured. As the control, there is used a catalyst (palladium content: 0.03 meg./g.) prepared by conducting, only once, the series of processes consisting of contacting with an aqueous solution containing palladium ammine complex, drying and heating, by the same manner as in Example 3.

The result is as follows:

TABLE 4

| Reaction time (hours) | 0 | 1 | 2 | 3 | 4 | 5 | 6 |
|---|---|---|---|---|---|---|---|
| Catalyst of Example 4 | 61 | 55 | 54 | 54 | 54 | 54 | 54 |
| Control | 54 | 42 | 35 | 34 | 32 | 27 | |

NOTE.—Reaction conditions: $H_2$:cyclohexane=10:1 (molar ratio); temperature: 285° C.; flow rate of $H_2$: 18 l./hr. (20° C.); catalyst amount: 0.50 g.

EXAMPLE 5

A reaction vessel is charged with 50 parts by weight of finely crushed active carbon (100 to 150 mesh) and 500 parts by weight of 60 weight percent nitric acid, followed by stirring at 70 to 90° C. for 3 hours. When evolution of nitrogen dioxide gas has ceased, the resultant is slowly cooled, washed with 1000 parts by volume of deionized water by decantation and dried at room temperature in vacuo. Thus treated active carbon is mixed with 111 parts by volume of an aqueous solution containing 0.0451 meg./ml. of palladium ammine complex, which is prepared by dissolving 4 parts by weight of palladium chloride in 1000 parts by volume of a concentrated aqueous ammonium solution, as well as with 100 parts by volume of water. The total mixture is kept standing at room temperature for 100 hours, at the end of which time the mixture is heated at 150° C. in atmosphere. The resultant mass is mixed with 500 parts by volume of an aqueous solution containing 0.1 meg./ml. of aluminum nitrate and the mixture is kept standing at room temperature for 100 hours, at the end of which time the mixture is washed with water until no nitrate ion is detected and then dried at room temperature in vacuo. These procedures give 50 parts by weight of a catalyst which contains 0.10 meg./g. of palladium and 1.0 meg./g. of aluminum.

0.5 part by weight of the catalyst thus produced is charged in a Pyrex glass reaction tube, and air is introduced into the tube at a rate of 0.20 l./min. at 150° C. for 1 hour. Then, the air is replaced by helium gas, and hydrogen gas is introduced into the tube at a rate of 0.20 l./min. at 150° C. for 1 hour to reduce the catalyst.

Catalytic activity of the catalyst thus treated is measured.

The result is as follows:

TABLE 5.—VELOCITY CONSTANT IN HYDROGENATION OF BENZENE×$10^3$ $k$ (mol/hr. g. atm.)

| Reaction time (minutes) | 2 | 30 | 90 | 120 |
|---|---|---|---|---|
| Catalyst of Example 5 | 4.2 | 4.1 | 4.1 | 4.1 |
| Control 1 | 3.5 | 2.1 | 1.9 | 1.9 |
| Control 2 | 2.2 | 1.8 | 1.6 | 1.4 |

NOTE.—Reaction conditions: $H_2$:benzene=10:1 (molar ratio); temperature: 150° C.; catalyst amount: 0.5 g.; flow rate of $H_2$: 18 l./hr. (20° C.).
Control 1: Catalyst prepared in the same manner as in this example except that contact with the aqueous solution containing aluminum nitrate and procedures to be followed are omitted (palladium content: 0.10 meg./g.).
Control 2: Catalyst prepared by absorbing a hydrochloric acid solution of palladium chloride on an active carbon (palladium content: 0.10 meq./g.).

EXAMPLE 6

50 parts by weight of the same active carbon as in Example 5 is treated with nitric acid solution in the same manner as in Example 5, and then mixed with 100 parts by volume of water as well as with 111 parts by volume of an aqueous solution containing 0.0451 meq./ml. of palladium ethylenediamine complex, which is prepared by dissolving 4 parts by weight of palladium nitrate in 1000 parts by volume of 6 N aqueous ethylenediamine solution. The mixture is kept standing at room temperature for 100 hours, at the end of which time the mixture is washed with water and dried at room temperature in vacuo. The resulting mass is mixed with 500 parts by volume of an aqueous solution containing 0.10 meq./ml. of thorium nitrate and the mixture is kept standing at room temperature for 100 hours, after which time the mixture is washed with water until no nitrate ion is detected and dried at room temperature in vacuo, followed by heating at 350° C. for 1 hour under blowing a mixed gas (water vapor: nitrogen=1:5 molar ratio) at a rate of 0.2 l./min.

These procedures give 50 parts by weight of a catalyst which contains 0.10 meq./g. of palladium and 1.0 meq./g. of thorium.

After the catalyst is reduced by heating at 300° C. for 1 hour under blowing hydrogen gas at a rate of 0.2 l./min., catalytic activity of the catalyst is measured.

The result is as follows:

TABLE 6.—CATALYTIC ACTIVITY IN DEHYDROGENATION OF CYCLOHEXANE TO BENZENE

Cyclohexane conversion to benzene (percent)

| Reaction time (hours) | 0.25 | 1 | 2 | 3 | 4 |
|---|---|---|---|---|---|
| Catalyst of Example 6 | 65 | 61 | 61 | 60 | 60 |
| Control 1 | 47 | 35 | 29 | 24 | 18 |
| Control 2 | 34 | 22 | 15 | 13 | 11 |

NOTE.—Reaction conditions: $H_2$:cyclohexane=10:1 (molar ratio); temperature: 300° C.; total pressure: 1 atom.; catalyst amount: 0.50 g.; flow rate of $H_2$: 18 l./hr. (20° C.).
Control 1: Catalyst prepared in the same manner as in this example except that contact with the aqueous solution containing thorium nitrate and procedures to be followed are omitted (palladium content 0.10 meq./g.).
Control 2: The same as the Control 2 of Example 5.

EXAMPLE 7

A reaction vessel is charged with 10 parts by weight of finely crushed active carbon (100 to 150 mesh) and 200 parts by weight of 60 wt. percent nitric acid, and treated in the same manner as in Example 5. Thus-treated active carbon is mixed with 266 parts by volume of an aqueous solution containing 0.0451 meq./ml. of palladium amine complex, which is prepared in a similar manner to that described in Example 5. The mixture is kept standing at room temperature for 100 hours, at the end of which time the mixture is washed with water and dried at room temperature in vacuo, followed by heating at 150° C. for 1 hour under blowing air at a rate of 0.2 l./min. The resulting mass is mixed with 100 parts by volume of an aqueous solution containing 0.10 meq./ml. of cerium acetate and the mixture is kept standing at room temperature for 100 hours, at the end of which time the mixture is washed with water and dried at room temperature in vacuo. The resulting mass is diluted with 10 times as much weight of finely crushed active carbon (100 to 150 mesh) which is not subjected to the afore-mentioned treatment with nitric acid, and then heated at 150° C. for 1 hour under blowing air at a rate of 0.1 l./min.

The catalyst thus prepared contains 1.20 meq./g. of palladium and 1.0 meq./g. of cerium.

After the catalyst is reduced by heating at 150° C. under blowing hydrogen gas at a rate of 0.20 l./min., catalytic activity of the catalyst is measured.

The result is as follows:

TABLE 7.—VELOCITY CONSTANT IN HYDROGENATION OF BENZENE ×10²

$k$ (mol/hr. g. atm.)

| Reaction time (hours) | 1/6 | 1/2 | 1 | 2 | 3 |
|---|---|---|---|---|---|
| Catalyst of Example 7 | 12.2 | 11.8 | 11.5 | 11.4 | 11.5 |
| Control 1 | 11.1 | 10.3 | 9.5 | 8.9 | 8.5 |
| Control 2 | 4.8 | 4.5 | 4.1 | 3.8 | 3.6 |

NOTE.—Reaction conditions: $H_2$:benzene=10:1 (molar ratio); temperature: 150° C.; catalyst amount: 0.5 g.; flow rate of $H_2$: 18 l./hr. (20° C.).
Control 1: Catalyst prepared in the same manner as in this example example except that contact with the aqueous solution containing cerium acetate and procedures to be followed are omitted (palladium content: 1.20 meq./g.).
Control 2: Catalyst prepared in the same manner as in the Control 2 of Example 5 (palladium content: 1.2 meq./g.).

EXAMPLE 8

Four kinds of catalysts (palladium content: 0.03 meq./g., thorium content: 1.0 meq./g.) are prepared in the same manner as in Example 1 except that each of silica-magnesia (MgO content: 25 wt. percent, specific surface area: 600 m.²/g., acidity measured in water: 1.3 meq./g.), alumina-boria ($B_2O_3$ content: 15 wt. percent, specific surface area: 250 m.²/g., acidity measured in water: 0.80 meq./g.), silica-alumina-zirconia ($Al_2O_3$ content: 10 wt. percent, $ZrO_2$ content: 6 wt. percent, specific surface area: 450 m.²/g., acidity measured in water: 1.5 meq./g.) and silica (specific surface area: 640 m.²/g., acidity measured in water: 0.3 meq./g.) are used in place of the silica-alumina.

Catalysts thus produced are reduced in the same manner as in Example 1, and their catalytic activities are measured.

The result is as follows:

TABLE 8.—VELOCITY CONSTANT IN HYDROGENATION OF BENZENE ×10²

$k$ (mol/hr. g. atm.)

| Solid carrier | Reaction time (hours) | | | |
|---|---|---|---|---|
| | 0 | 2 | 4 | 6 |
| Silica-magnesia | 1.71 | 1.67 | 1.63 | 1.62 |
| Alumina-boria | 1.45 | 1.42 | 1.39 | 1.39 |
| Silica-alumina-zirconia | 1.86 | 1.82 | 1.80 | 1.81 |
| Silica | 1.04 | 1.01 | 0.97 | 0.95 |

NOTE.—Reaction conditions: $H_2$:benzene=10:1 (molar ratio); temperature: 150° C.; catalyst amount: 0.50 g.; flow rate of $H_2$: 18 l./hr. (20° C.).

EXAMPLE 9

An active carbon catalyst containing 0.95 meq./g. of palladium and 1.0 meq./g. of aluminum is prepared in the same manner as in Example 5 except that 106 parts by volume of an aqueous solution containing 0.451 meq./ml. of palladium ammine complex, 150 parts by volume of water and 250 parts by volume of an aqueous solution containing 0.20 meq./ml. of aluminum sulfate are used in place of 111 parts by volume of the aqueous solution containing 0.0451 meq./ml. of palladium amine complex, 100 parts by volume of water and 500 parts by volume of the aqueous solution containing 0.1 meq./ml. of aluminum nitrate, respectively.

After the catalyst is reduced by heating at 300° C. for 2 hours under blowing hydrogen gas at a rate of 0.2 l./min., catalytic activity of the catalyst is measured.

The result is as follows:

TABLE 9.—VELOCITY CONSTANT IN HYDROGENATION OF BENZENE ×10²

$k$ (mol/hr. g. atm.)

| Reaction time (hours) | 0 | 1 | 2 | 4 |
|---|---|---|---|---|
| Catalyst composition of Example 9 | 7.98 | 7.93 | 7.91 | 7.91 |
| Control | 3.51 | 3.32 | 3.21 | 3.18 |

NOTE.—Reaction conditions: $H_2$:benzene=10:1 (molar ratio); temperature: 150° C.; catalyst amount: 0.5 g.; flow rate of $H_2$: 18 l./hr. (20° C.).
Control: Commercially available palladium on active carbon catalyst (palladium content: 0.95 meq./g.).

EXAMPLE 10

The same procedures as in Example 9 are conducted except using 50 parts by weight of the same silica-alumina as in Example 1 in place of the active carbon to produce a catalyst composition containing 0.95 meq./g. of palladium and 1.0 meq./g. of aluminum.

Catalytic activity of the catalyst is measured in the same manner as in Example 9.

The result is as follows:

TABLE 10.—VELOCITY CONSTANT IN HYDROGENATION OF BENZENE×10²

$k$ (mol/hr. g. atm.)

| Reaction time (hours) | 0 | 1 | 2 | 4 |
|---|---|---|---|---|
| Catalyst composition of Example 10 | 7.77 | 7.72 | 7.65 | 7.64 |
| Control | 3.51 | 3.32 | 3.21 | 3.18 |

NOTE.—Reaction conditions: H₂:benzene=10:1 (molar ratio); temperature: 150° C.; catalyst amount: 0.5 g.; flow rate of H₂: 18 l./hr (20° C.).
Control: The same as Control of Example 9.

What is claimed is:

1. A method for preparing a supported palladium catalyst, which comprises carrying out at least twice a series of process steps which consist of contacting a carrier selected from the group consisting of (1) an oxide amorphous solid acid carrier containing acid sites and (2) an active carbon containing acid sites prepared by contacting an active carbon with an aqueous solution of nitric acid, with a basic aqueous solution of a palladium ammine complex or a palladium lower alkylamine complex, the lower alkylamine having 1 to 4 carbon atoms, and drying and subjecting the thus-treated solid carrier to a thermal-treatment by heating at about 100 to about 800° C., the amount of the above basic aqueous solution in each step being 2 to 10 parts by volume per volume of the carrier, and the total amount of the complex brought into contact with the carrier being 0.001 to 6 milliequivalent per gram of the carrier.

2. A method according to claim 1 wherein between two of the steps or after the last step is inserted a series of process steps consisting of (1) contacting the carrier with about 2 to about 10 parts by volume per volume of the carrier of an aqueous solution of a water-soluble salt of a metal having 3 or 4 valencies, said metal being capable of forming a metal oxide which has a heat of formation of not lower than about 100 kcal./metal atom and a melting point of not lower than about 1000° C., and (2) drying and subjecting the thus-treated carrier to a thermal-treatment by heating at about 100 to about 800° C., the sum of the total amount of the complex brought into contact with the carrier and that of the metal salt brought into contact with the carrier being 0.001 to 6 milliequivalent per gram of the carrier.

3. A method according to claim 1, wherein the carrier is an oxide amorphous solid carrier containing acid sites.

4. A method according to claim 3, wherein the oxide amorphous solid acid carrier containing acid sites is a carrier selected from the group consisting of silica, alumina, silica-alumina, activated clay, silica-alumina-zirconia, alumina-boria and silica-magnesia.

5. A method according to claim 2, wherein an oxide amorphous solid acid carrier containing acid sites is used as a carrier.

6. A method according to claim 1, wherein the carrier is an active carbon containing acid sites, which is prepared by contacting an active carbon with an aqueous solution of nitric acid.

7. A method according to claim 2, wherein the carrier is an active carbon containing acid sites, which is prepared by contacting an active carbon with an aqueous solution of nitric acid.

8. A method for preparing a supported palladium catalyst, which comprises (1) contacting an active carbon containing acid sites, prepared by contacting an active carbon with an aqueous solution of nitric acid, with about 2 to about 10 volume parts per volume of the active carbon of a basic aqueous solution of a palladium amine complex or a palladium lower alkylamine complex, the lower alkylamine having 1 to 4 carbon atoms, followed by drying and heating at about 100 to about 500° C., and (2) contacting the thus-treated active carbon with about 2 to about 10 volume parts per volume of the active carbon of an aqueous solution of a water-soluble salt of a metal having 3 or 4 valencies, each metal being capable of forming a metal oxide which has a heat of formation not lower than about 100 kcal./metal atom and a melting point of not lower than about 1000° C.; followed by drying and heating at about 100 to about 500° C., the sum of the total amount of the complex brought into contact with the active carbon and that of the metal salt brought into contact with the active carbon being about 0.001 to about 6 milliequivalent per gram of the active carbon.

9. A method according to claim 2, wherein the metal salt is thorium nitrate, lanthanum nitrate, aluminum nitrate, cerium acetate or aluminum sulfate.

10. A method according to claim 8, wherein the metal salt is thorium nitrate, lanthanum nitrate, aluminum nitrate, cerium acetate or aluminum sulfate.

References Cited
UNITED STATES PATENTS

| | | | |
|---|---|---|---|
| 2,707,674 | 5/1955 | Sweitzer | 23—209.9 |
| 3,378,590 | 4/1968 | Usami | 260—598 |
| 1,875,795 | 9/1932 | Zurcher | 252—445 |
| 1,849,503 | 3/1932 | Mommaerts | 252—445 |
| 1,819,314 | 8/1931 | Zucher | 252—445 |
| 1,712,930 | 5/1929 | Morrell | 252—445 |
| 2,592,016 | 4/1952 | Engel | 252—472 |
| 2,818,394 | 12/1957 | Haensel | 252—466 |
| 3,288,725 | 11/1966 | Aftandilian | 252—447 |
| 2,857,337 | 10/1958 | Hamilton | 252—472 |
| 2,823,235 | 2/1958 | Graham | 260—580 |
| 3,453,204 | 7/1969 | Mulaskey | 208—111 |
| 3,098,030 | 7/1963 | Coonradt | 208—111 |
| 2,760,940 | 8/1956 | Schwareenbek | 252—466 |
| 2,662,861 | 12/1953 | Ribiett | 252—455 |
| 2,888,397 | 5/1959 | Burton | 208—138 |
| 2,818,393 | 12/1957 | Lefrancois | 252—466 |
| 2,623,860 | 12/1952 | Haensel | 252—441 |
| 2,848,510 | 8/1958 | Myers | 252—460 |
| 2,814,599 | 11/1957 | Lefrancois | 252—460 |

D. E. WYMAN, Primary Examiner

P. M. FRENCH, Assistant Examiner

U.S. Cl. X.R.

252—447, 460, 462, 466